United States Patent
Leventhal

(10) Patent No.: US 8,091,810 B2
(45) Date of Patent: Jan. 10, 2012

(54) CHEESE CRUMBLING DEVICE

(76) Inventor: Ira Harris Leventhal, San Jose, CA (US)

(*) Notice: Subject to any disclaimer, the term of this patent is extended or adjusted under 35 U.S.C. 154(b) by 53 days.

(21) Appl. No.: 12/636,752

(22) Filed: Dec. 13, 2009

(65) Prior Publication Data

US 2010/0147981 A1     Jun. 17, 2010

Related U.S. Application Data

(60) Provisional application No. 61/122,392, filed on Dec. 14, 2008.

(51) Int. Cl.
*A47J 43/00* (2006.01)
(52) U.S. Cl. .............. 241/30; 241/169; 241/262
(58) Field of Classification Search ............... 426/518; 241/169, 262, 264, 30
See application file for complete search history.

(56) References Cited

U.S. PATENT DOCUMENTS

| | | | | |
|---|---|---|---|---|
| 2,297,342 | A | * | 9/1942 | Woodard ............... 241/84.3 |
| 2,692,430 | A | | 10/1954 | Kraft |
| 3,187,432 | A | | 6/1965 | Cuomo |
| 3,277,574 | A | | 10/1966 | Giasi |
| 3,980,235 | A | | 9/1976 | Kuhlman |
| 4,275,851 | A | * | 6/1981 | Weese ............... 241/169 |
| 4,599,928 | A | | 7/1986 | Oker |
| 4,620,838 | A | | 11/1986 | Miller |
| 4,646,602 | A | | 3/1987 | Bleick |
| 5,425,307 | A | | 6/1995 | Rush |
| 5,723,158 | A | | 3/1998 | Fager |
| 5,967,434 | A | | 10/1999 | Virk |
| 6,340,490 | B1 | | 1/2002 | Owens |
| 6,511,006 | B1 | * | 1/2003 | Holcomb et al. ............ 241/169 |
| 6,549,823 | B1 | | 4/2003 | Hicks |
| 6,561,067 | B2 | | 5/2003 | Arrasmith |
| D537,304 | S | | 2/2007 | Wong |
| 7,377,201 | B2 | | 5/2008 | Chen |
| 7,429,010 | B2 | | 9/2008 | McCormick |
| 7,891,591 | B1 | * | 2/2011 | Hodgson et al. ............ 241/30 |

OTHER PUBLICATIONS

Viking Machine & Design, Inc., http://www.vikingmachine.com/bluecheese.html, "Blue Cheese->Specialty Blue Cheese Equipment->Cheese Crumbler", De Pere, WI, US, Dec. 2005.
Cabinplant A/S, http://www.cabinplant.com/products_solutions/select_a_processmachine/cutting_and_trimming/cheese_dicer/, "Products and Solutions->Cutting and trimming->Cheese dicer", Haarby, DK, Dec. 2007.
Urschel Laboratories, Inc., http://www.urschel.com/Model_RAD_9229bc966a962c135f3b6f.html, "Machines->Dicers->Model RA-D Dicer", Valparaiso, IN, US, Dec. 2010.

* cited by examiner

*Primary Examiner* — Mark Rosenbaum

(57) ABSTRACT

An apparatus and method for crumbling a food product such as a block of cheese into irregularly shaped food particles. One embodiment of the apparatus consists of a chute-shaped housing that contains two opposing plates with a plurality of smooth, rounded, finger-like protrusions on their faces, where the plates are closer together towards the bottom of the chute. When food is inserted into the top of the chute and one of the plates is moved in an up-and-down motion, the protrusions on the opposing plates crumble the food into progressively smaller food particles until the crumbled particles drop through the gap between the bottoms of the plates and out the bottom of the chute. Other embodiments are described and shown.

20 Claims, 19 Drawing Sheets

CHEESE CRUMBLING DEVICE

CROSS-REFERENCE TO RELATED APPLICATIONS

This application claims the benefit of provisional patent application Ser. No. 61/122,392, filed 2008 Dec. 14 by the present inventor.

BACKGROUND

Prior Art

The following is a tabulation of some prior art that presently appears relevant:

U.S. Patents

| Pat. No. | Kind Code | Issue Date | Patentee |
| --- | --- | --- | --- |
| 2,692,430 | A | 1954-10-26 | Kraft et al. |
| 3,187,432 | A | 1965-06-08 | Cuomo |
| 3,277,574 | A | 1966-10-11 | Giasi |
| 3,980,235 | A | 1976-09-14 | Kuhlman |
| 4,599,928 | A | 1986-07-15 | Oker |
| 4,620,838 | A | 1986-11-04 | Miller et al. |
| 4,646,602 | A | 1987-03-03 | Bleick |
| 5,425,307 | A | 1995-06-20 | Rush et al. |
| 5,723,158 | A | 1998-03-03 | Fager et al. |
| 5,967,434 | A | 1999-10-19 | Virk |
| 6,340,490 | B1 | 2002-01-22 | Owens |
| 6,561,067 | B2 | 2003-05-13 | Arrasmith |
| 6,549,823 | B1 | 2003-04-15 | Hicks et al. |
| D537304 | S | 2007-02-27 | Wong et al. |
| 7,377,201 | B2 | 2008-05-27 | Chen |
| 7,429,010 | B2 | 2008-09-30 | McCormick et al. |

NONPATENT LITERATURE DOCUMENTS

Viking Machine & Design, Inc., http://www.vikingmachine.com/bluecheese.html, "Blue Cheese→Specialty Blue Cheese Equipment→Cheese Crumbler".

Cabinplant A/S, http://www.cabinplant.com/products_solutions/select_a_processmachine/cutting_and_trimming/cheese_dicer/, "PRODUCTS AND SOLUTIONS→Cutting and trimming→Cheese dicer".

Urschel Laboratories, Inc., http://www.urschel.com/Model-_RAD_9229bc966a962c135f3b6f.html
"Machines→Dicers→Model RA-D Dicer".

There are a number of popular cheeses that are typically served in crumbled form. Several examples are feta cheese, blue cheese, and Gorgonzola cheese. These cheeses are typically crumbled by hand, a process which can be messy as well as difficult to control. This is especially inconvenient at the serving table, since the person crumbling the cheese has to leave the table to clean their hands, both before and after doing the crumbling.

There are no products currently available which can be used in a kitchen or serving table environment which produce irregularly shaped cheese crumbles such as those that would be produced by hand crumbling. The existing products for processing cheese in a kitchen or at a serving table employ either a grating or slicing action. Cheese graters or shredders, such as in U.S. Pat. No. 5,967,434 (1999), U.S. Pat. No. 4,620,838 (1986), and D537,304 (2007), even when used with the largest available holes, will produce long, thin slices of cheese as opposed to crumbles. Portable cheese cutters employing wires or blades, such as in U.S. Pat. No. 3,277,574 (1966), U.S. Pat. No. 4,599,928 (1986), and U.S. Pat. No. 4,646,602 (1987), produce uniform slices or cubes of cheese. Many of these portable devices must be placed on a surface for proper operation, preventing the disbursement of the crumbled cheese particles directly onto a dining plate or into a food container.

There are a number of patents on cheese processing devices and machines that are designed for use in a commercial food processing and manufacturing setting. These devices are not portable for use at a serving table or a typical home or restaurant kitchen, and usually require electric motors in their operation. Many of these devices, such as in U.S. Pat. No. 2,692,430 (1954), U.S. Pat. No. 3,187,432 (1965), U.S. Pat. No. 3,980,235 (1976), U.S. Pat. No. 5,723,158 (1998), U.S. Pat. No. 6,340,490 (2002), U.S. Pat. No. 6,561,067 (2003), U.S. Pat. No. 6,549,823 (2003), and U.S. Pat. No. 7,377,201 (2008), employ blades, wires, or shredders to process the cheese in such a way that they are not capable of producing irregularly shaped cheese particles. U.S. Pat. No. 5,425,307 (1995) and U.S. Pat. No. 7,429,010 (2008) present devices which can produce irregularly shaped cheese particles. However, in addition to not being portable for use at serving tables and typical home or restaurant kitchens, these devices employ a series of knife assemblies which do not perform a hand-crumbling type of action.

There are several commercially available products that feature the ability to dice or crumble cheeses that are normally served in a crumbled form, such as the Cheese Crumbler from Viking Machine, the Cheese Dicer from Cabinplant, and the Model RA-D Dicer from Urschel Laboratories. All of these products are large, non-portable, motor-driven machines designed for use in a commercial setting, and all of them use cutting blades or screens which do not perform a hand crumbling type of action.

Another drawback of the commercial food processing devices is that many of them contain numerous moving parts, are large in size, and contain electric motors that are required in their operation. This combination of attributes make the devices difficult to clean, inconvenient to store, and expensive to manufacture, maintain, and ship.

As I have described, the patented and/or commercially available devices for reducing cheese to small particles suffer from some or all of the following disadvantages:

(a) The processing of the cheese is performed using wires, knife assemblies, or grating surfaces which cut the cheese into uniformly sized and regularly shaped particles that do not match the irregularly shaped particles produced by a hand crumbling action.

(b) The devices require an electric motor or other type of powered actuator in their operation.

(c) The devices are large, complex machines designed for use in a commercial food processing setting and are not easily portable.

(d) The devices have many moving parts and are complicated and expensive to manufacture, clean, maintain, and ship.

(e) The devices must be placed on a surface for proper operation, preventing the disbursement of the cheese directly onto a plate or other container of food.

(f) The employment of motors or other powered actuators, as well as cutting blades or wires can make the devices dangerous to operate if proper safety procedures are not followed.

SUMMARY

In accordance with one embodiment a cheese crumbling device consists of a tapered chute, with a larger opening on the top and a smaller opening on the bottom, containing two opposing plates with smooth, rounded, finger-like protrusions on the inside of the chute, one stationary and one that is moved up and down in the chute by the user of the device. Cheese or other food that is placed into the top of the chute is processed into progressively smaller particles until it falls out the bottom of the chute.

ADVANTAGES

Accordingly several advantages of one or more aspects are as follows: cheese is processed into crumbles that are similar in consistency to hand-crumbled cheese, the device is safe and easy to operate, the device is easily portable for use at a serving table or typical home or restaurant kitchen, the operator's hands are kept clean while crumbling cheese, crumbled cheese particles can be dispensed directly onto dining plates or into food containers, and the device is easy to clean. Other advantages of one or more aspects will be apparent from a consideration of the drawings and ensuing description.

DRAWINGS

Figures

In the drawings, closely related figures have the same number but different alphabetic suffixes.

REFERENCE NUMERALS

| 10  | Chute              | 20  | Input             |
|-----|--------------------|-----|-------------------|
| 30  | Output             | 40  | Stationary handle |
| 50  | Moving handle      | 60  | Stationary plate  |
| 70  | Moving plate       | 80  | Protrusion        |
| 81  | Recess             | 82  | Ridge             |
| 83  | Groove             | 90  | Slot              |
| 100 | Gap control screw  | 110 | Hinge             |
| 120 | Stand              | 125 | Connector         |
| 130 | Motor              | 140 | Switch            |
| 150 | Three-sided housing| 155 | Track             |
| 160 | Two-sided housing  |     |                   |

DETAILED DESCRIPTION

FIGS. 1, 2A-C, 3A-E, 4A, 10—First Embodiment

Figure 1:
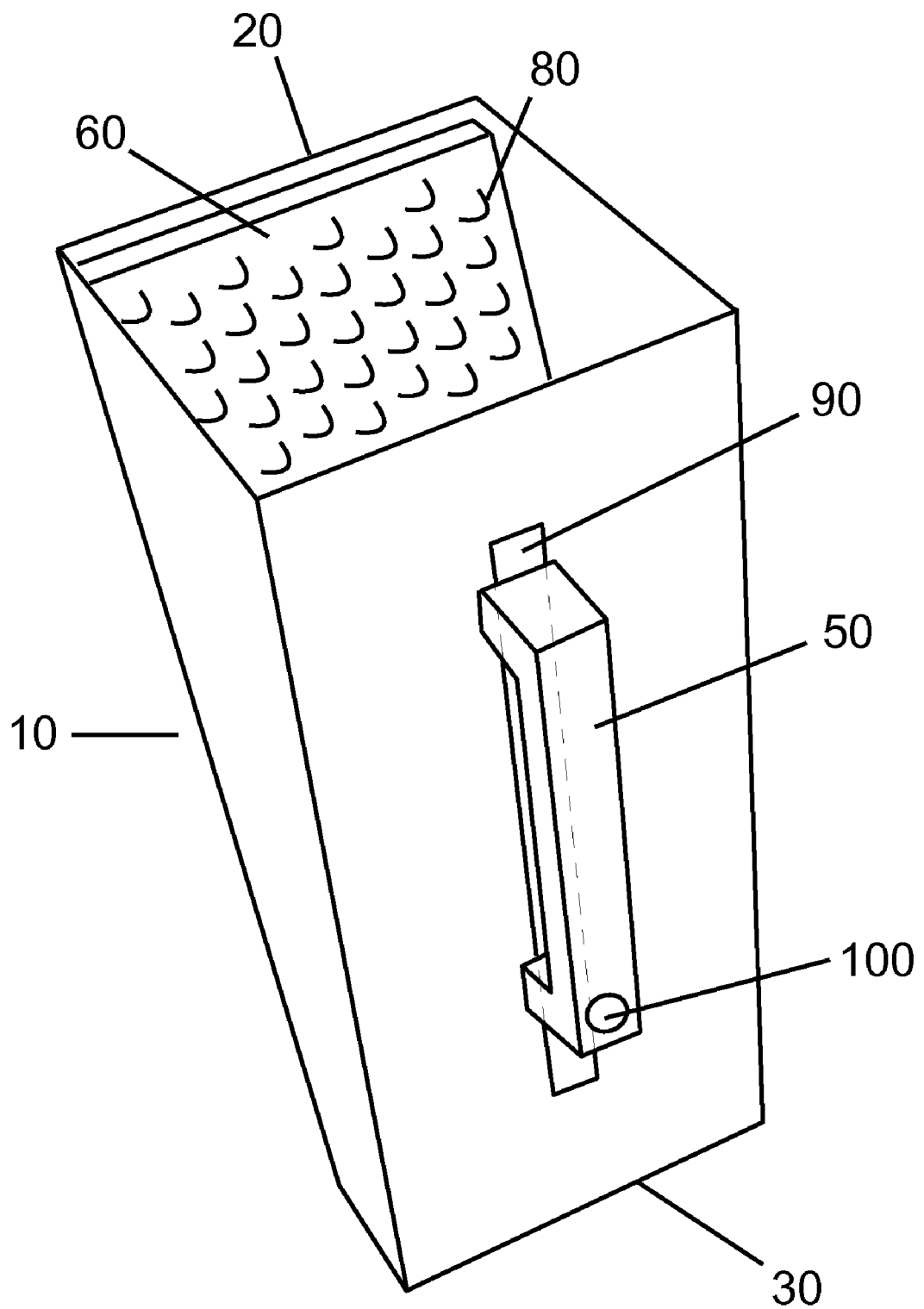
FIG. 1 shows a perspective view of a cheese crumbling device, in accordance with one embodiment.

One embodiment of the device is illustrated in FIGS. 1 (perspective view), 2A-C (side view), and 4A (front view). A chute 10 has a larger opening that is used as the input 20 at the top and a smaller opening that is used as the output 30 at the bottom. A stationary plate 60 is covered with a plurality of features selected from the group consisting of protrusions 80, recesses 81, ridges 82, grooves 83, and mixtures thereof, all having smooth, rounded, finger-like shapes (FIGS. 3A-E). Stationary plate 60 is attached to one side of the inside of chute 10, and completely covers the width and mostly covers the height of that side. A stationary handle 40 is attached to the outside of chute 10, on the same side as stationary plate 60. A moving plate 70 is covered with a plurality of features selected from the group consisting of protrusions 80, recesses 81, ridges 82, grooves 83, and mixtures thereof, all having smooth, rounded, finger-like shapes. Moving plate 70 moves up (FIG. 2B) and down (FIG. 2A) on the inside of chute 10 on the opposing side from stationary plate 60, and completely covers the width and mostly covers the height of that side. A moving handle 50 on the outside of chute 10 is attached to moving plate 70 through slot 90. A gap control screw 100 adjusts the distance between moving plate 70 and stationary plate 60 (FIGS. 2A and 2C) at the bottom of chute 10. A set of hinges 110 connect moving handle 50 to moving plate 70 and allow the angle between moving plate 70 and the side of chute 10 to change when gap control screw 100 is turned.

Figure 10:
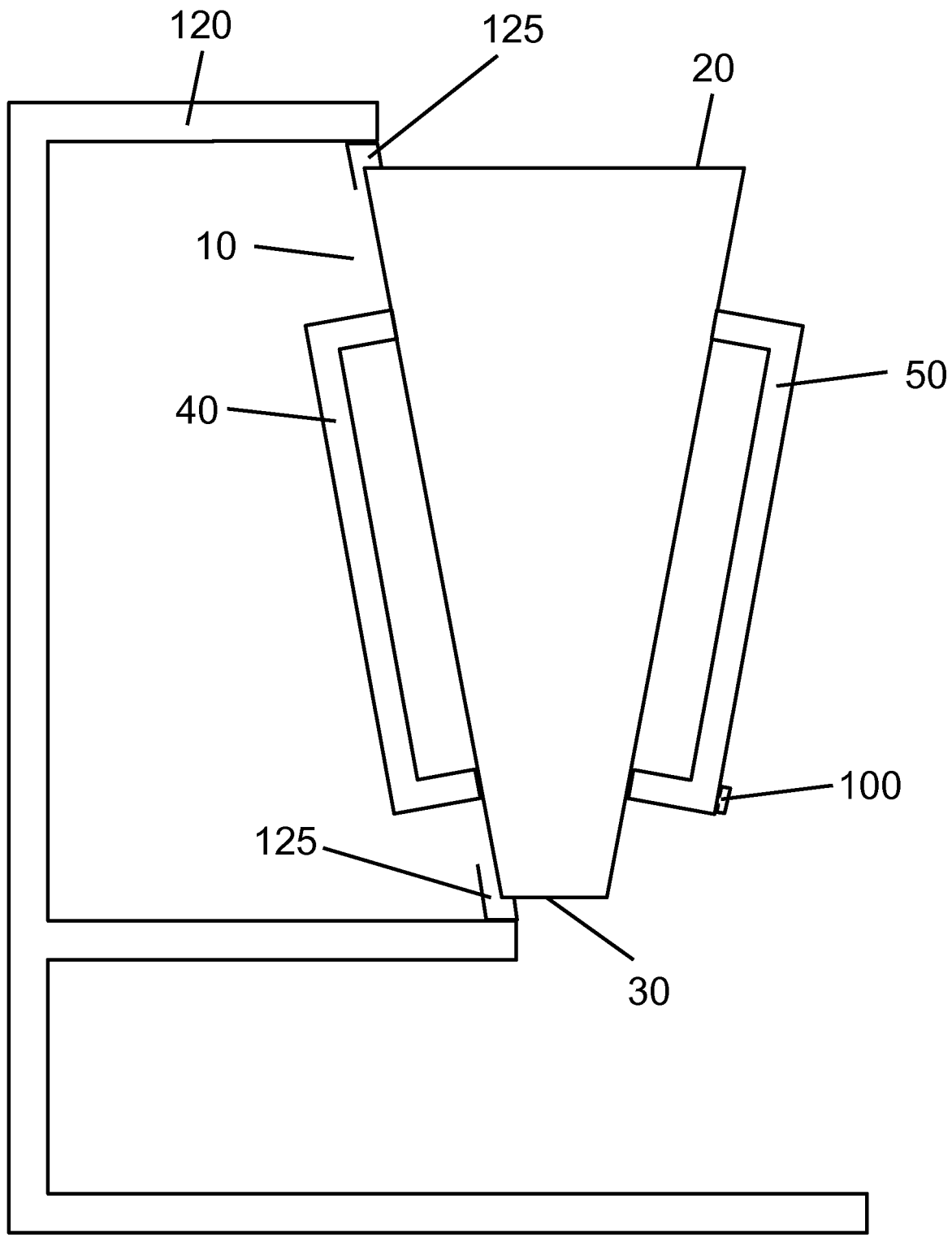
FIG. 10 shows a side view of a cheese crumbling device mounted on a stand, in accordance with the embodiment shown in FIG. 1.

As shown in FIG. 10, the device can be attached to an optional stand 120 using one or more connectors 125. Stand 120 is weighted sufficiently to hold the device in place when moving handle 50 is moved up and down.

Operation—FIGS. 2A-C, 4A, 10

Figure 2A:
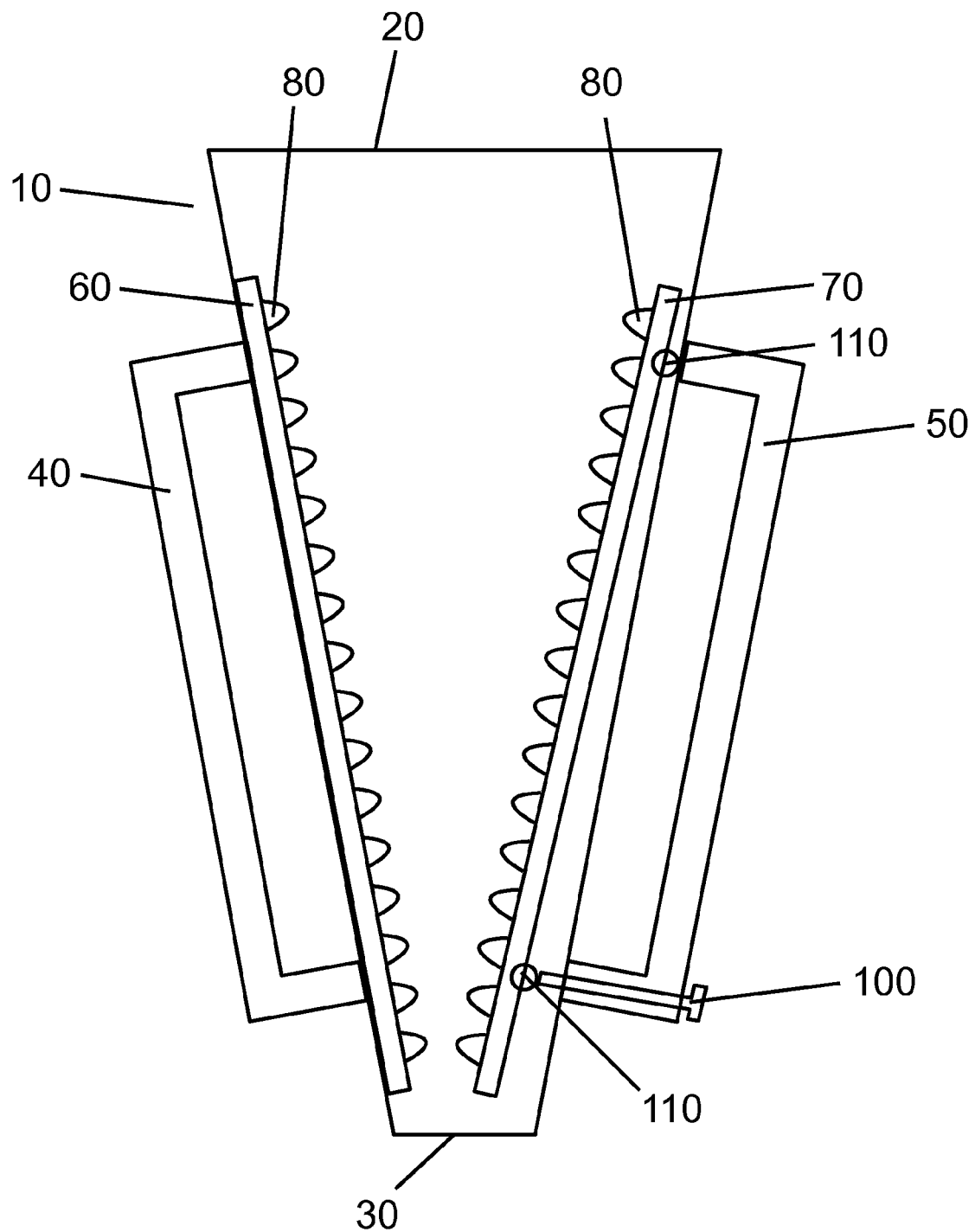
FIG. 2A shows a side view of a cheese crumbling device with the side panel of the chute removed so that the plates with protrusions are visible inside the chute, in accordance with the embodiment shown in FIG. 1.
Figure 2B:
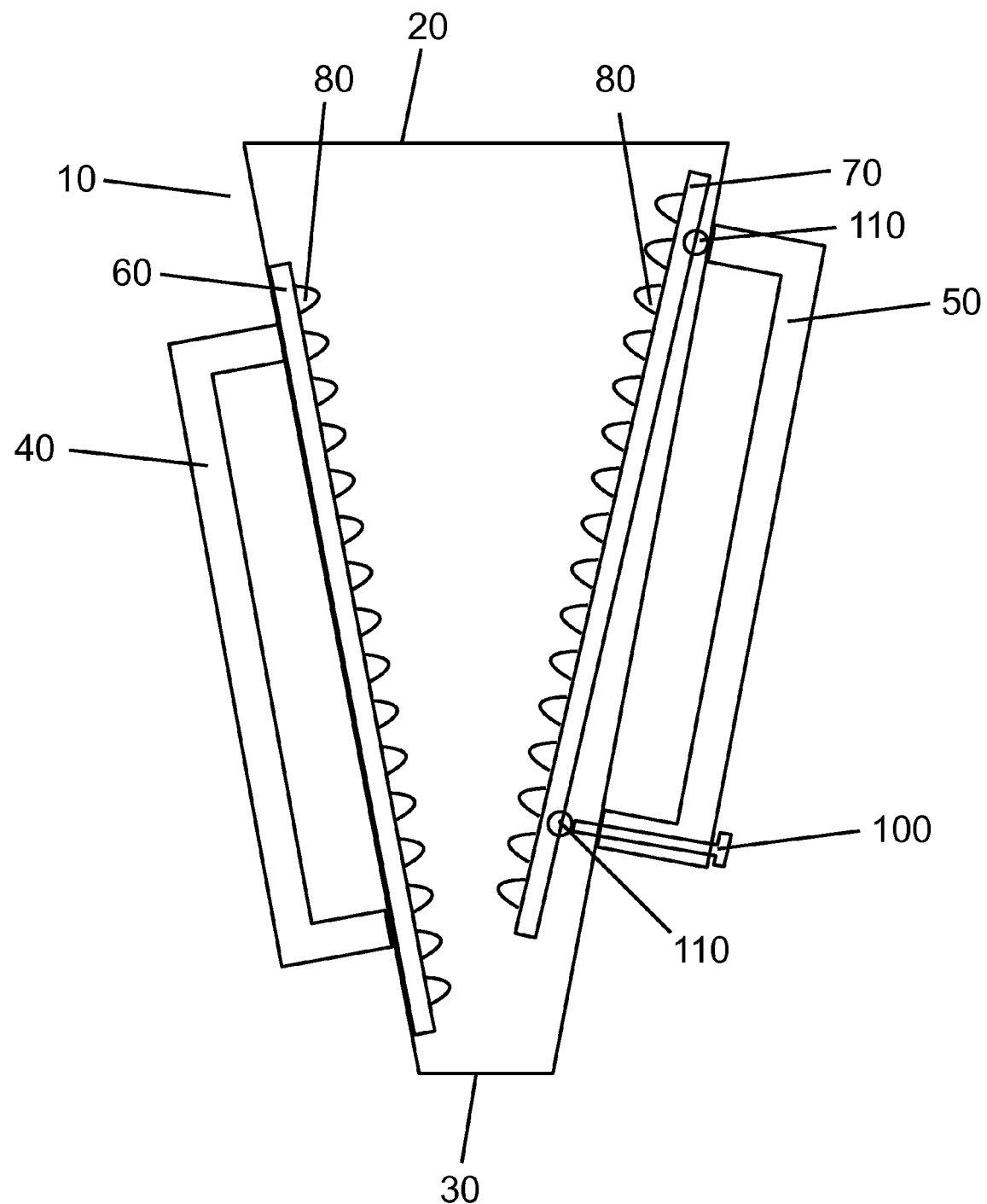
FIG. 2B shows the same view and embodiment as in FIG. 2A, with one of the plates moved upwards relative to the other plate.

A typical mode of operation of this embodiment of the device is as follows: a chunk of cheese or other food is placed into input 20 of chute 10. The user holds stationary handle 40 with one hand and moves moving handle 50 up and down in slot 90 (FIG. 4A) with the other hand. FIG. 2A shows moving handle 50 in the down position and FIG. 2B shows moving handle 50 in the up position. The cheese is rubbed by protrusions 80 on stationary plate 60 and moving plate 70. Protrusions 80 break down the cheese into progressively smaller particles as the cheese moves down chute 10. Once the crumbled cheese particles are small enough to fit through the gap between stationary plate 60 and moving plate 70 at the bottom of chute 10 the particles drop through output 30.

Figure 2C:
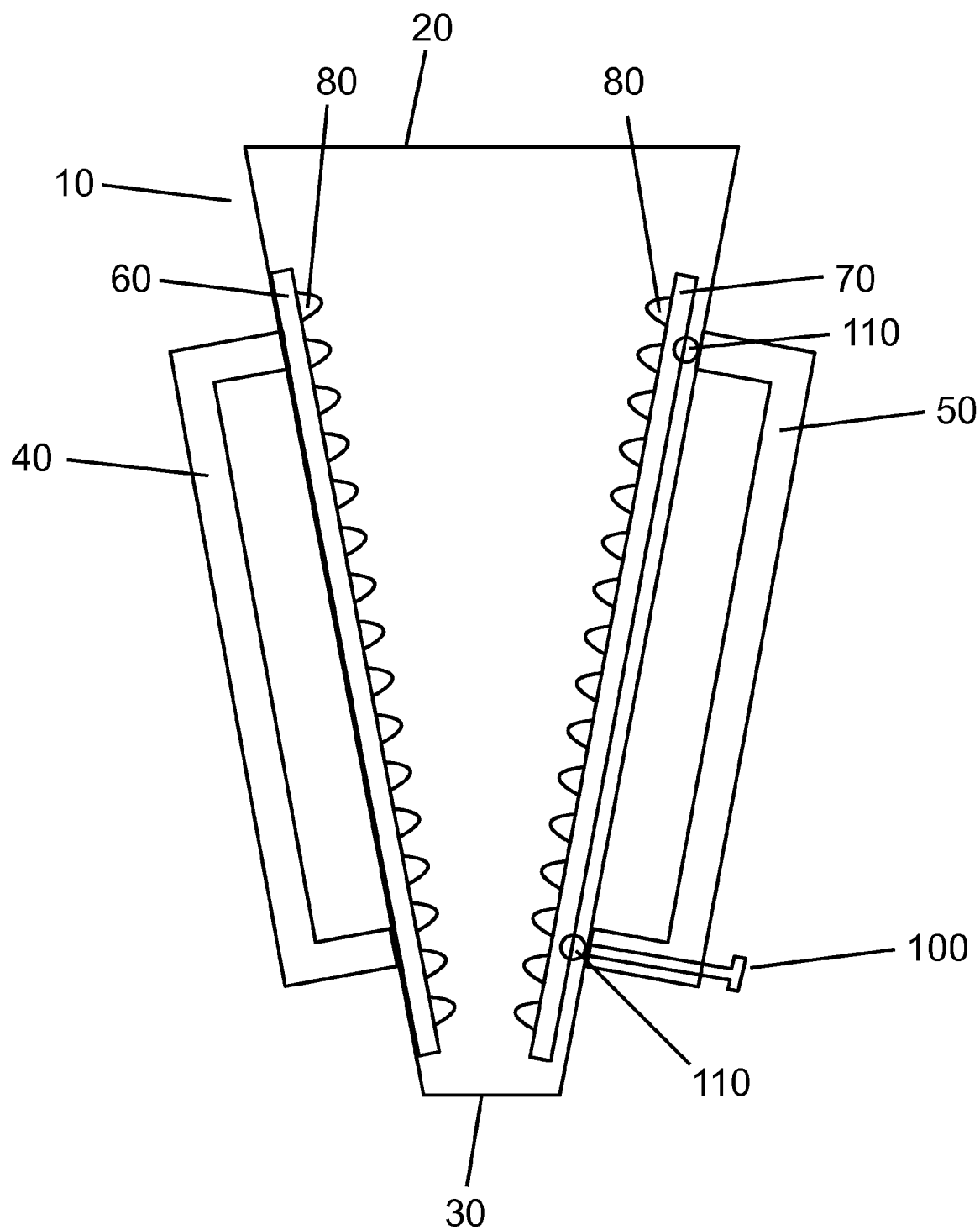
FIG. 2C shows the same view and embodiment as in FIG. 2A, with the spacing between the plates increased.
Figure 3A:
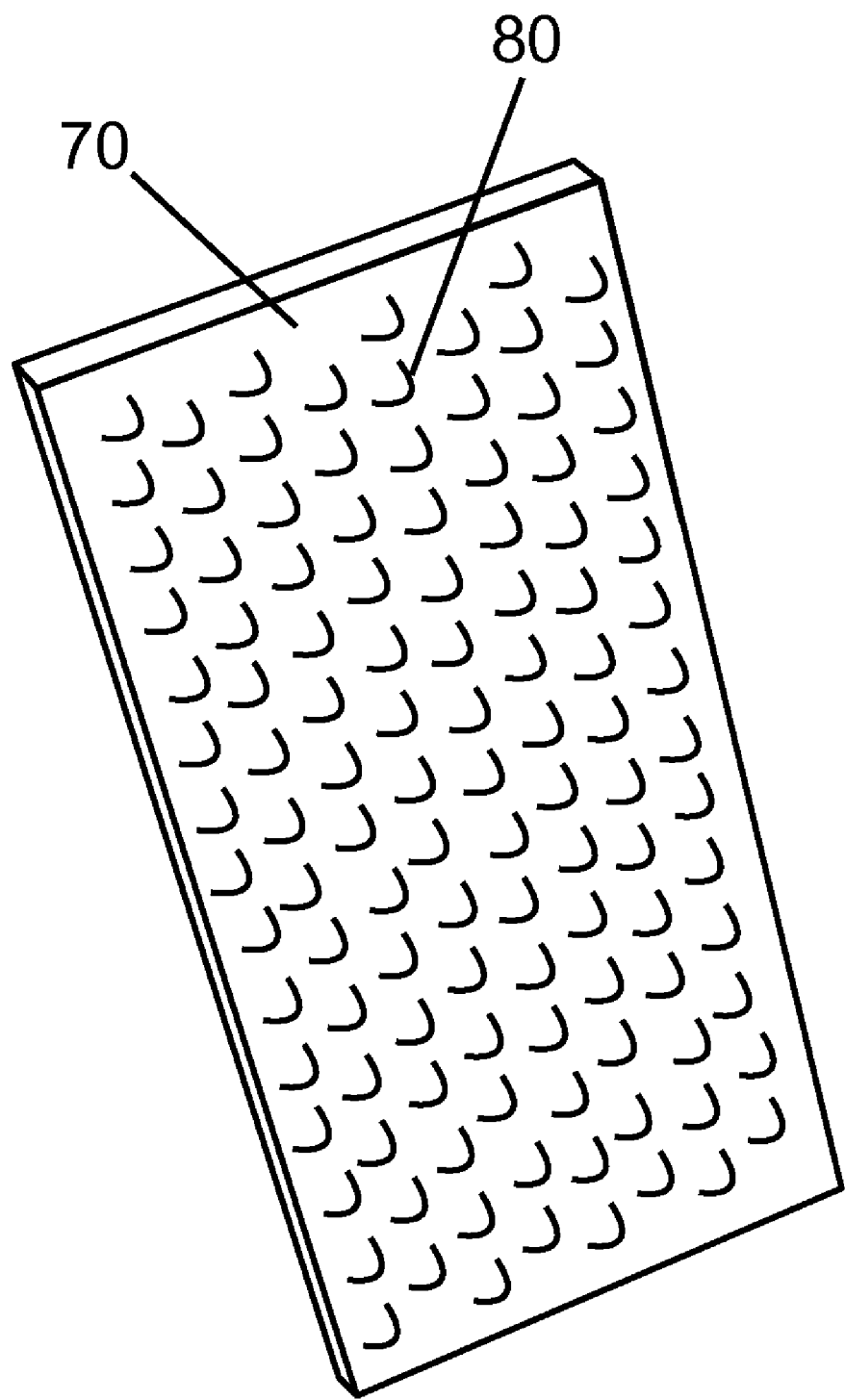
FIGS. 3A-3E show a perspective view of one of the plates, with features located on the surface of the plate selected from the group consisting of protrusions, recesses, ridges, grooves, and mixtures thereof, all having smooth, rounded, finger-like shapes, in accordance with the embodiment shown in FIG. 1.
Figure 3B:
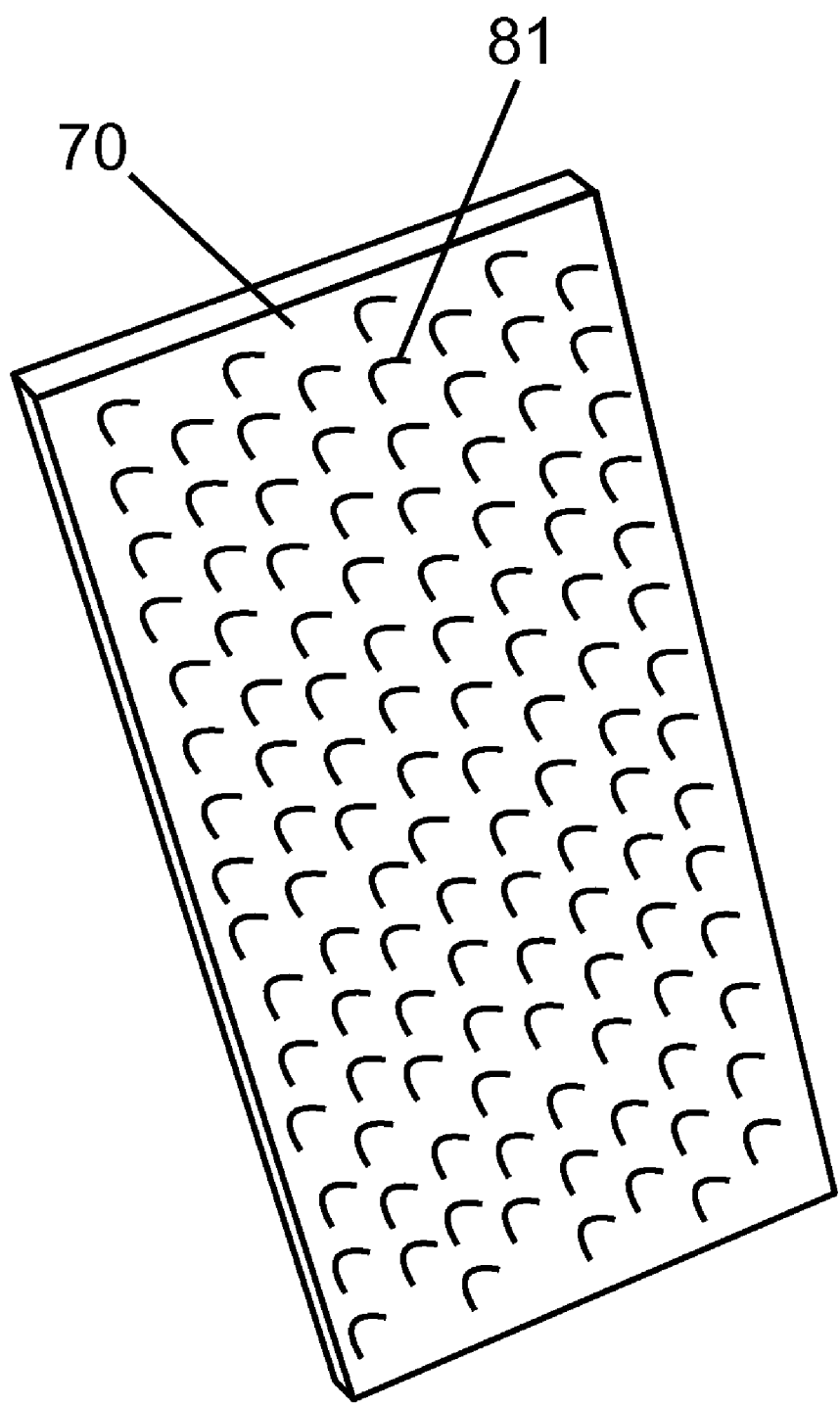
Figure 3C:
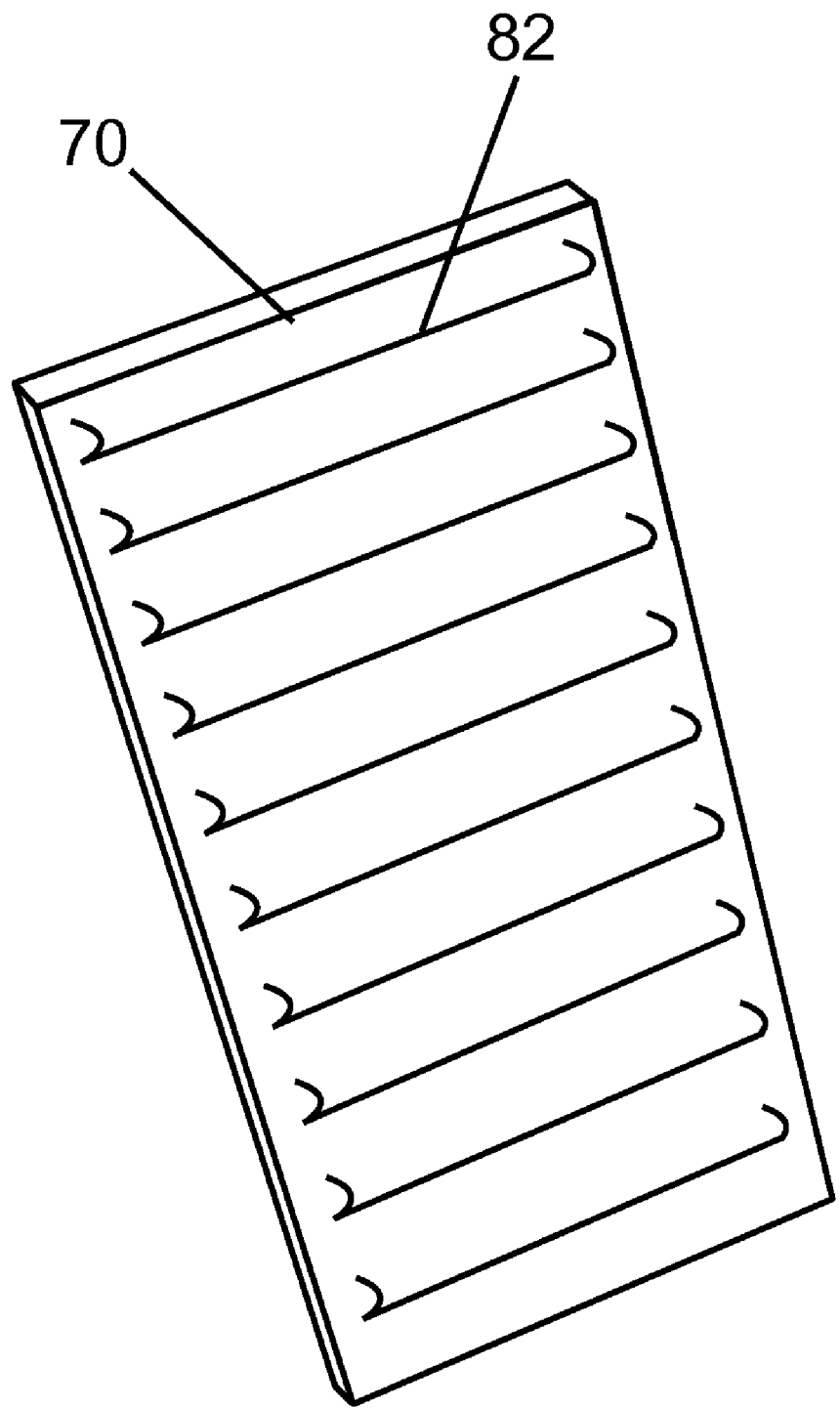
Figure 3D:
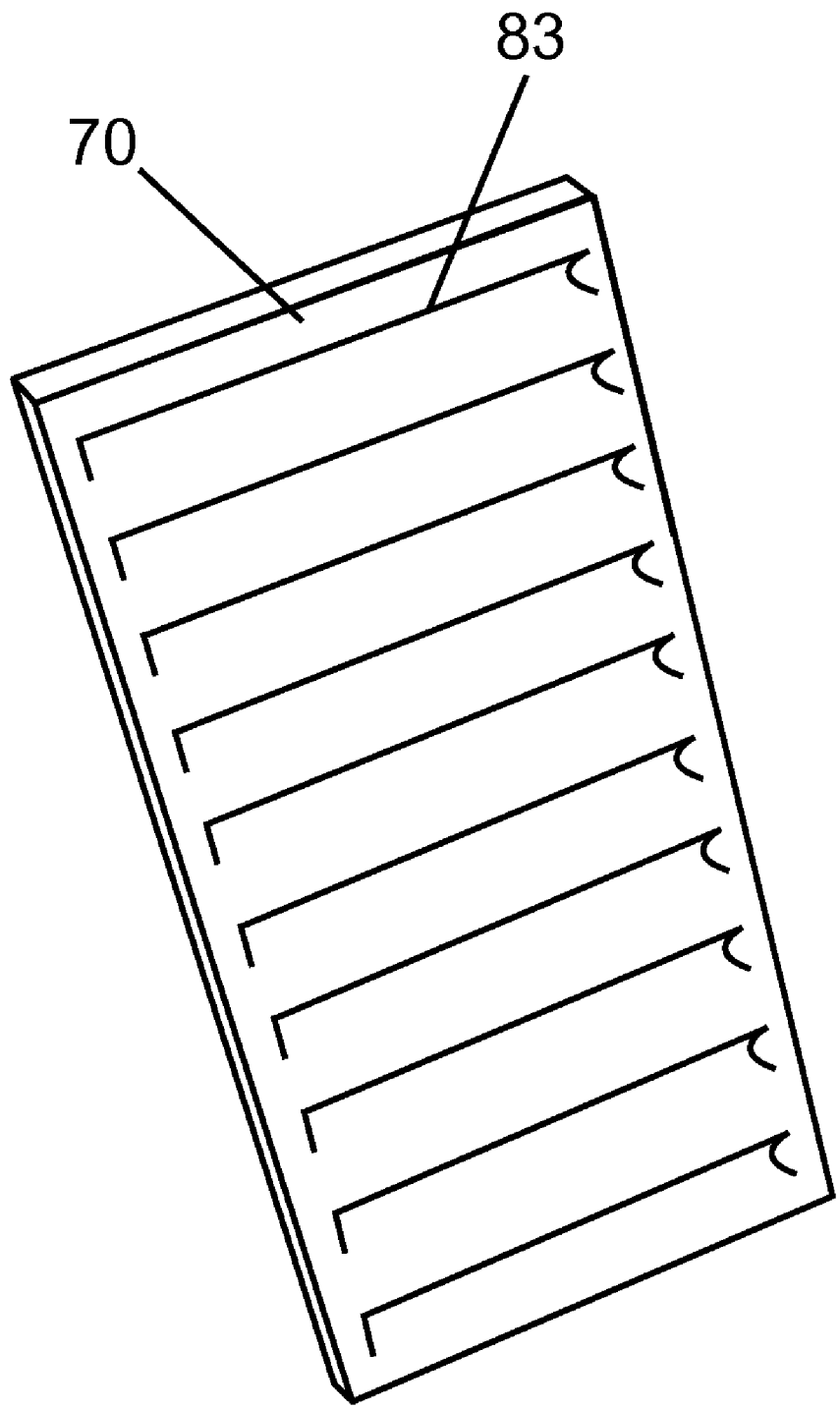
Figure 3E:
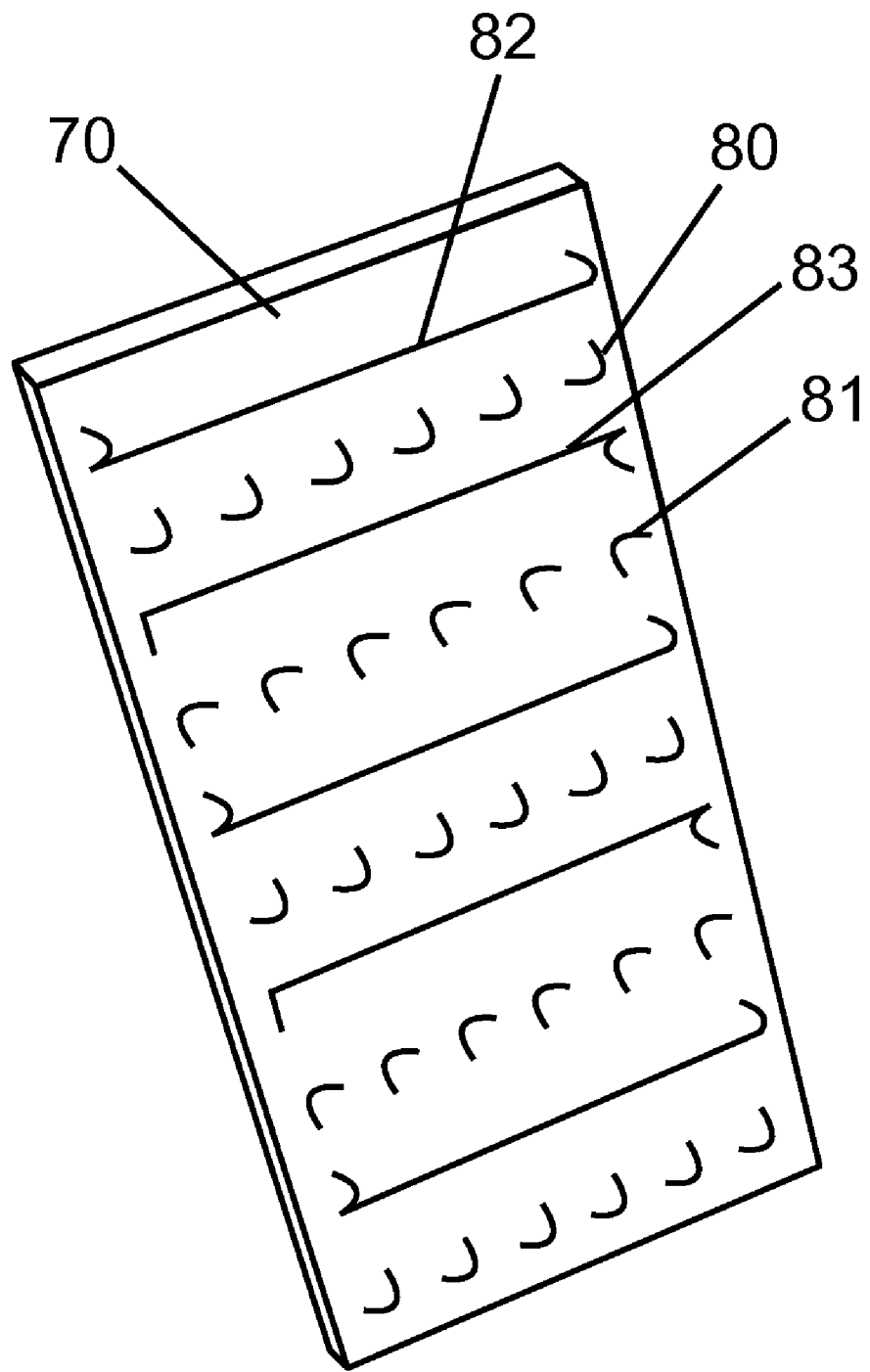

By turning gap control screw 100, which changes the size of the gap between stationary plate 60 and moving plate 70, the user can control the size of the particles that are produced by the device. FIG. 2C shows moving plate 70 moved further away from stationary plate 60 than in FIG. 2A.

The device is sized appropriately to allow it to be held and used by a person at a serving table or in a home or restaurant kitchen, and easily cleaned in a kitchen sink or a dishwasher.

When the device is attached to stand 120 with connectors 125 (FIG. 10), chute 10 is held in place by stand 120 while the user moves moving handle 50 up and down in slot 90. The device is operated with one hand in this mode of operation.

Figure 4A:
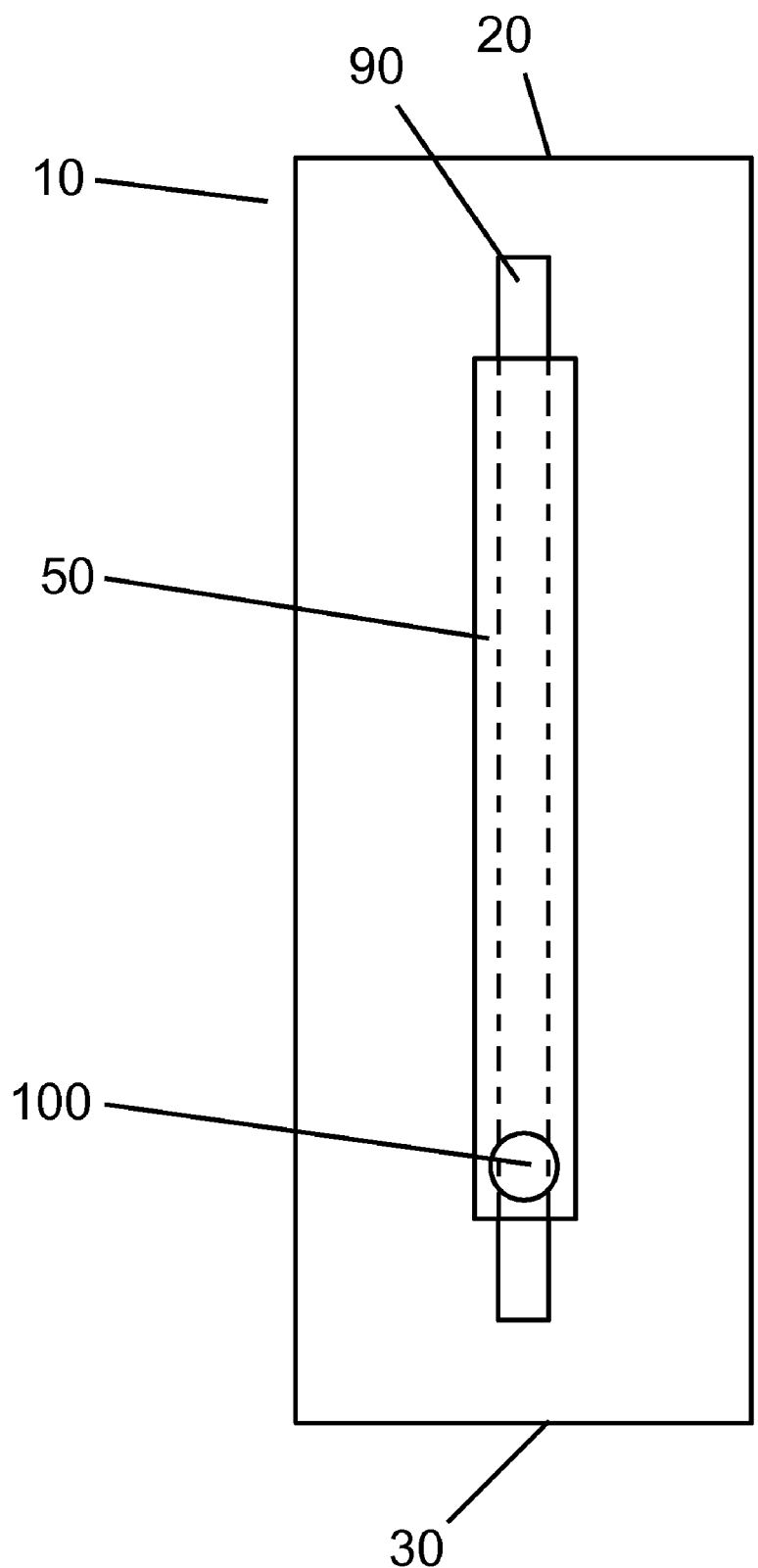
FIG. 4A shows a front view of a cheese crumbling device that is operated by sliding the moving handle in an up-and-down motion, in accordance with the embodiment shown in FIG. 1.
Figure 4B:
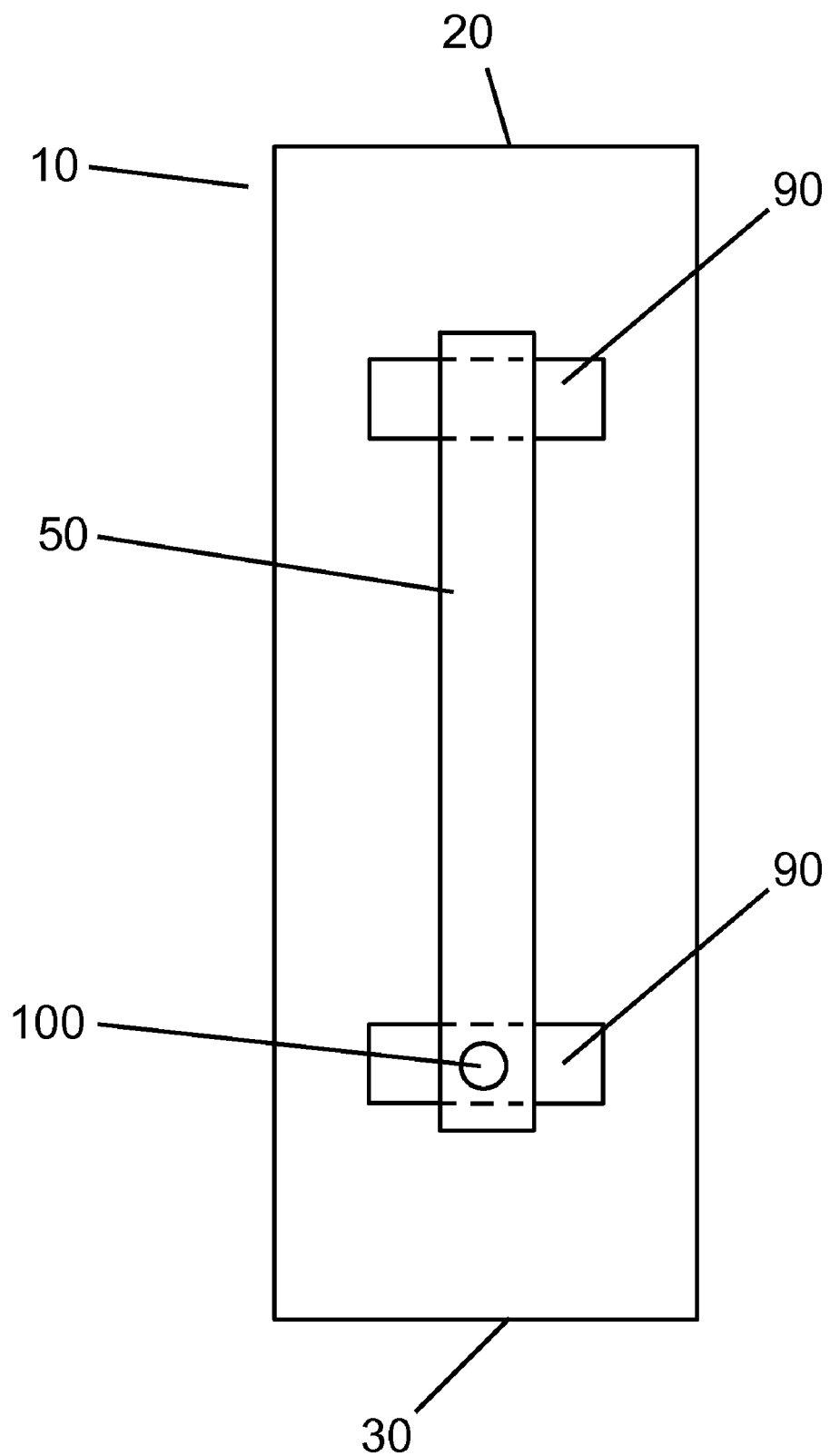
FIG. 4B shows a front view of a cheese crumbling device that is operated by sliding the moving handle in a side-to-side motion, in accordance with a second embodiment.

FIG. 4B—Second Embodiment

An additional embodiment is shown in FIG. 4B. In this embodiment slots 90 have a horizontal orientation, allowing the device to be operated by sliding moving handle 50 in a side-to-side motion.

Figure 4C:
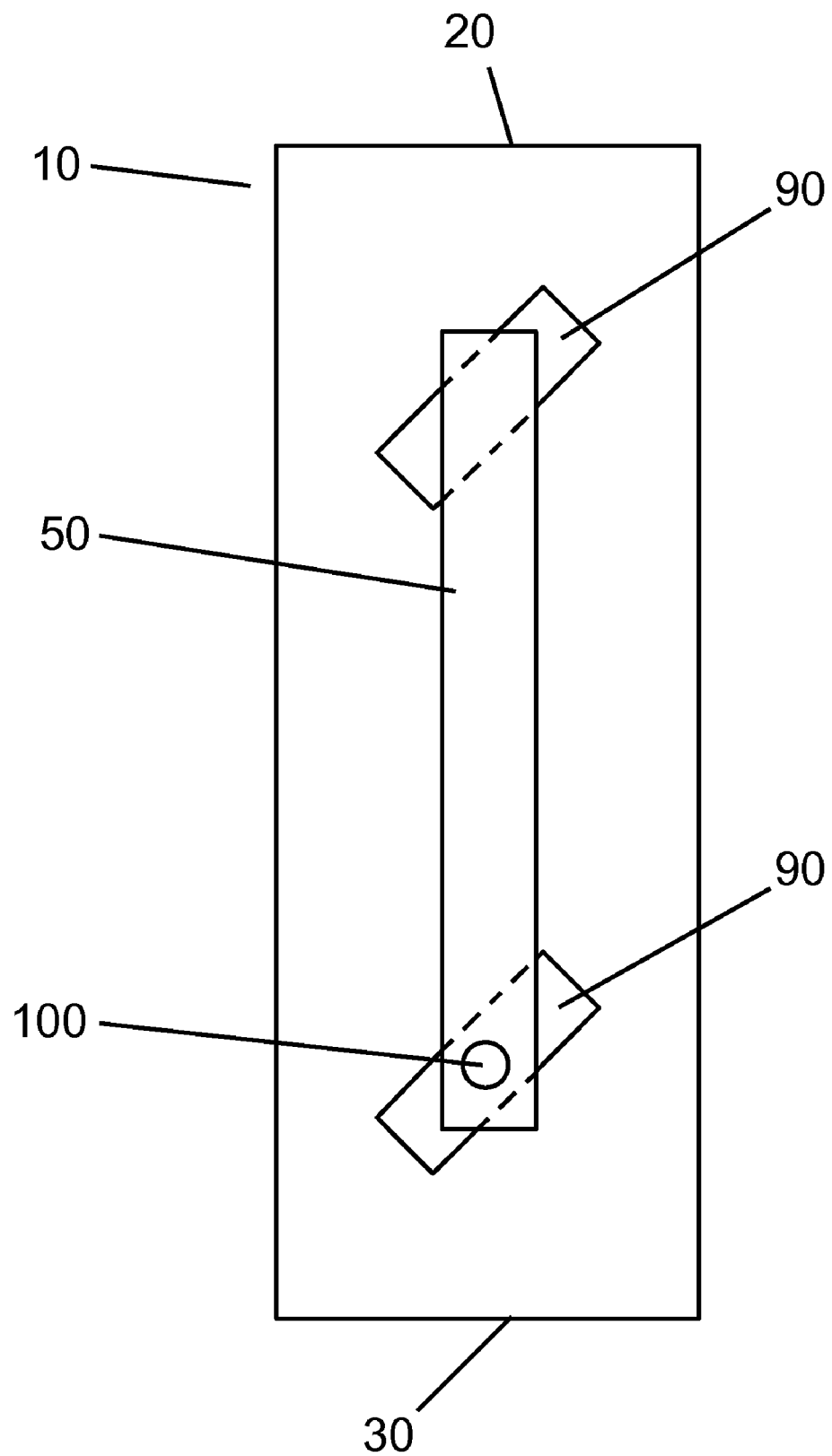
FIG. 4C shows a front view of a cheese crumbling device that is operated by sliding the moving handle in a diagonal motion, in accordance with a third embodiment.

FIG. 4C—Third Embodiment

An additional embodiment is shown in FIG. 4C. In this embodiment slots 90 have a diagonal orientation, allowing the device to be operated by sliding moving handle 50 in a diagonal motion.

Figure 5A:
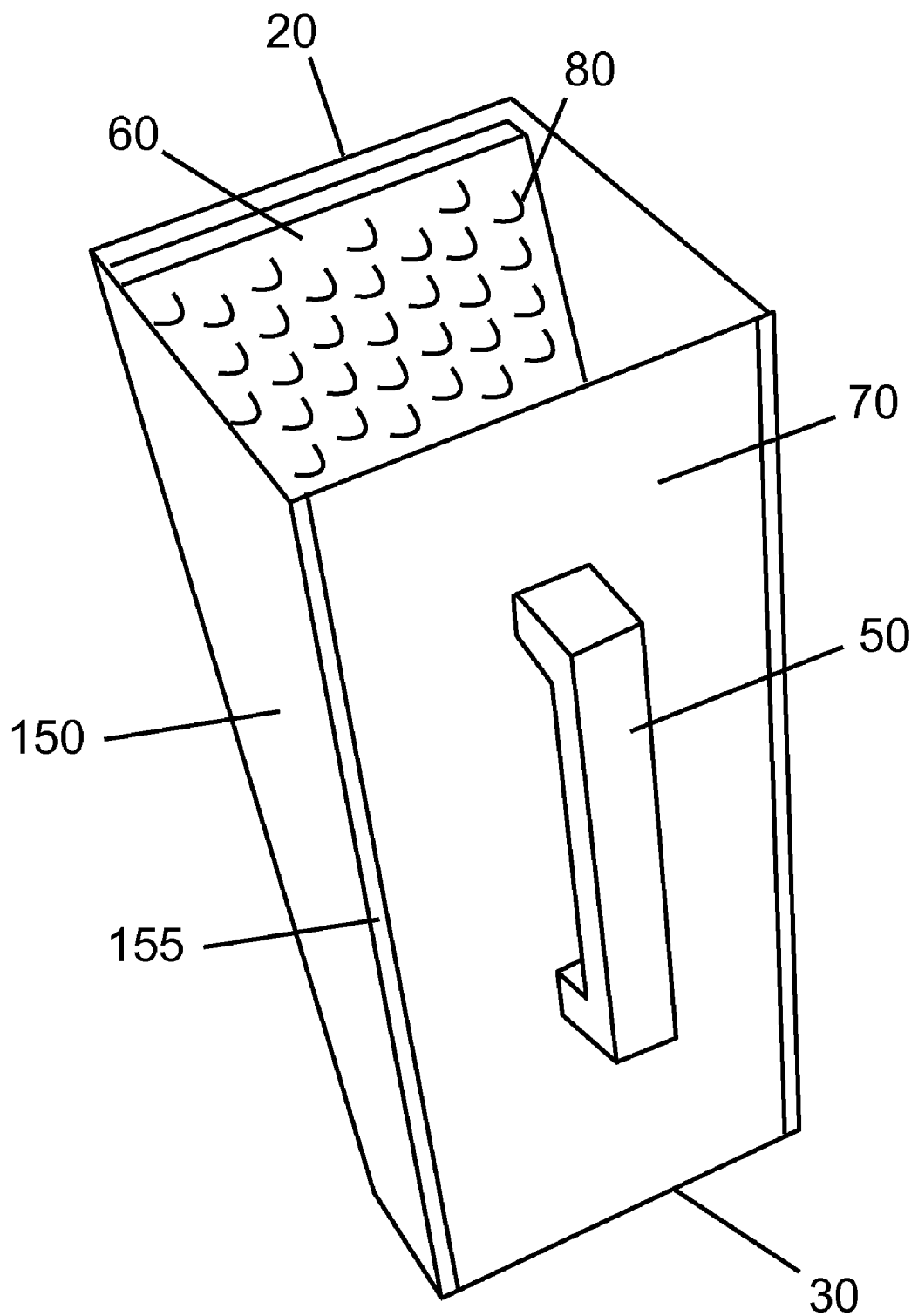
FIG. 5A shows a perspective view of a cheese crumbling device where the moving plate is integrated into the chute structure and in the down position, in accordance with a fourth embodiment.
Figure 5B:
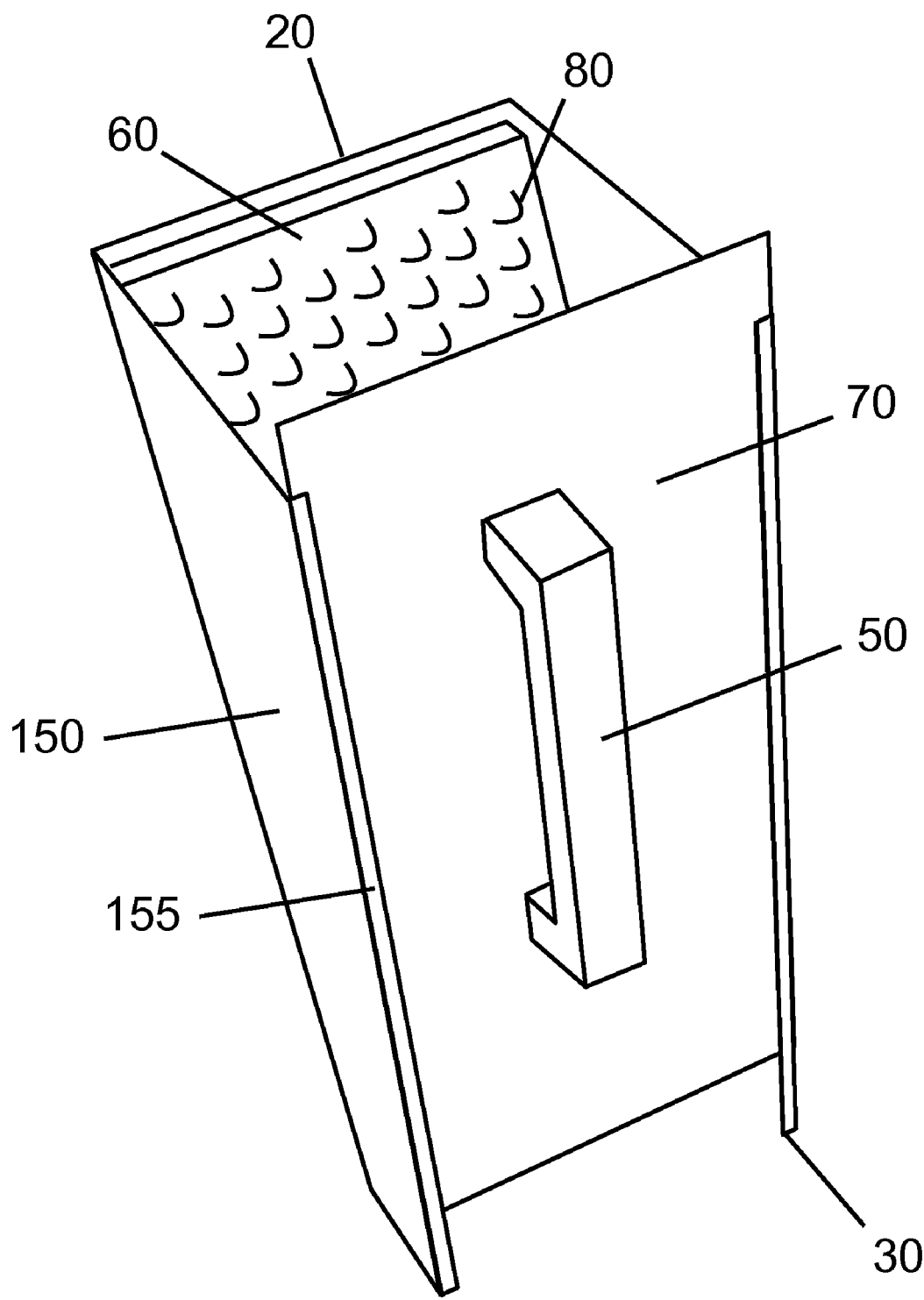
FIG. 5B shows the same view and embodiment as in FIG. 5A, with the moving plate in the up position.

FIGS. 5A, 5B—Fourth Embodiment

An additional embodiment is shown in FIGS. 5A and 5B. In this embodiment moving plate 70 is attached to three-sided housing 150 to form a structure with a chute shape. Moving plate 70 is attached using tracks 155 which allow moving plate 70 to slide up and down for proper operation of the device. FIG. 5A shows moving plate 70 in the down position and FIG. 5B shows moving plate 70 in the up position.

Figure 6:
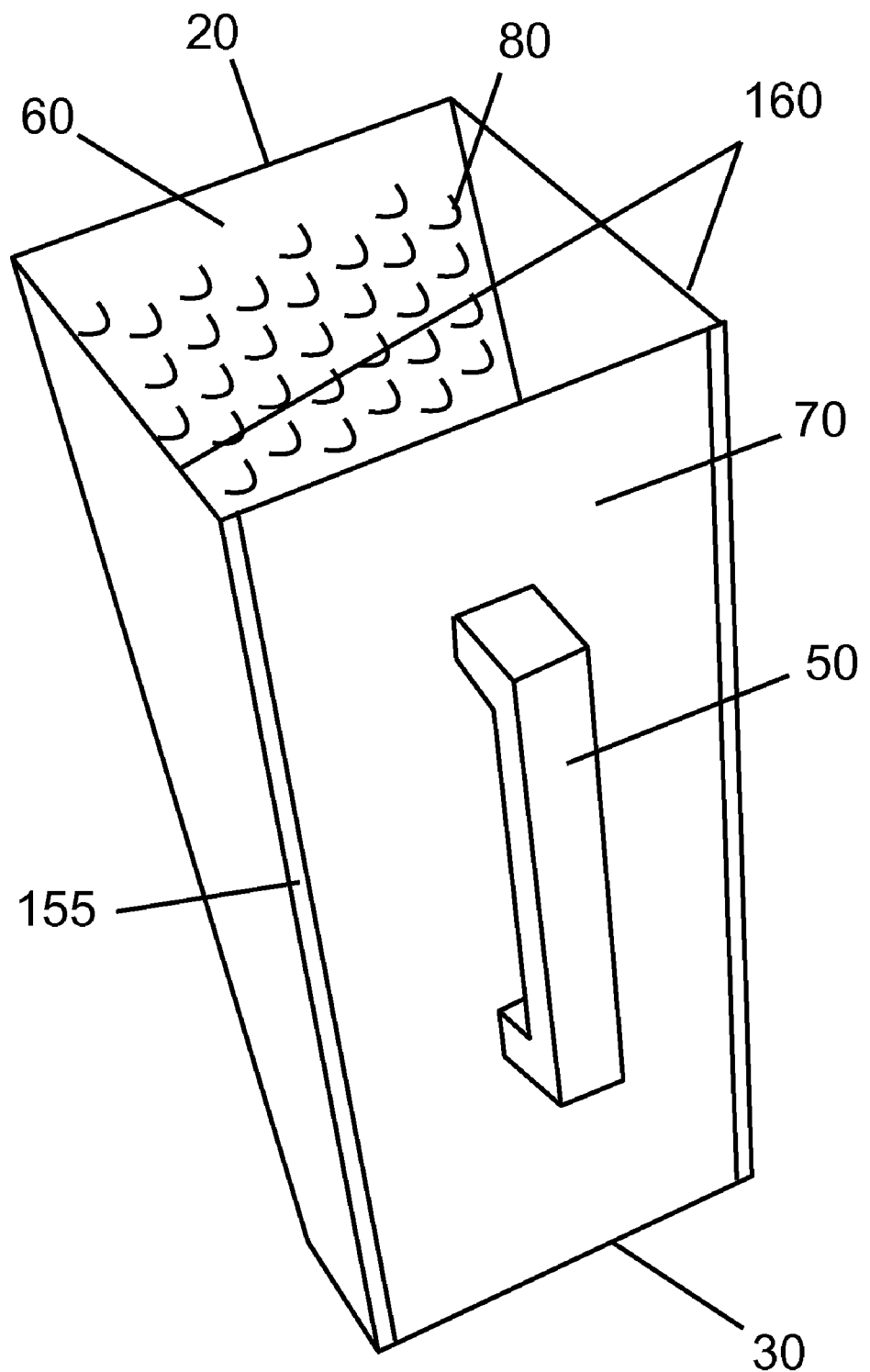
FIG. 6 shows a perspective view of a cheese crumbling device where both plates are integrated into the chute structure, in accordance with a fifth embodiment.

FIG. 6—Fifth Embodiment

An additional embodiment is shown in FIG. 6. In this embodiment moving plate 70 and stationary plate 60 are attached to two-sided housing 160 to form a structure with a chute shape. Moving plate 70 is attached using tracks 155 which allow moving plate 70 to slide up and down for proper operation of the device.

Figure 7:
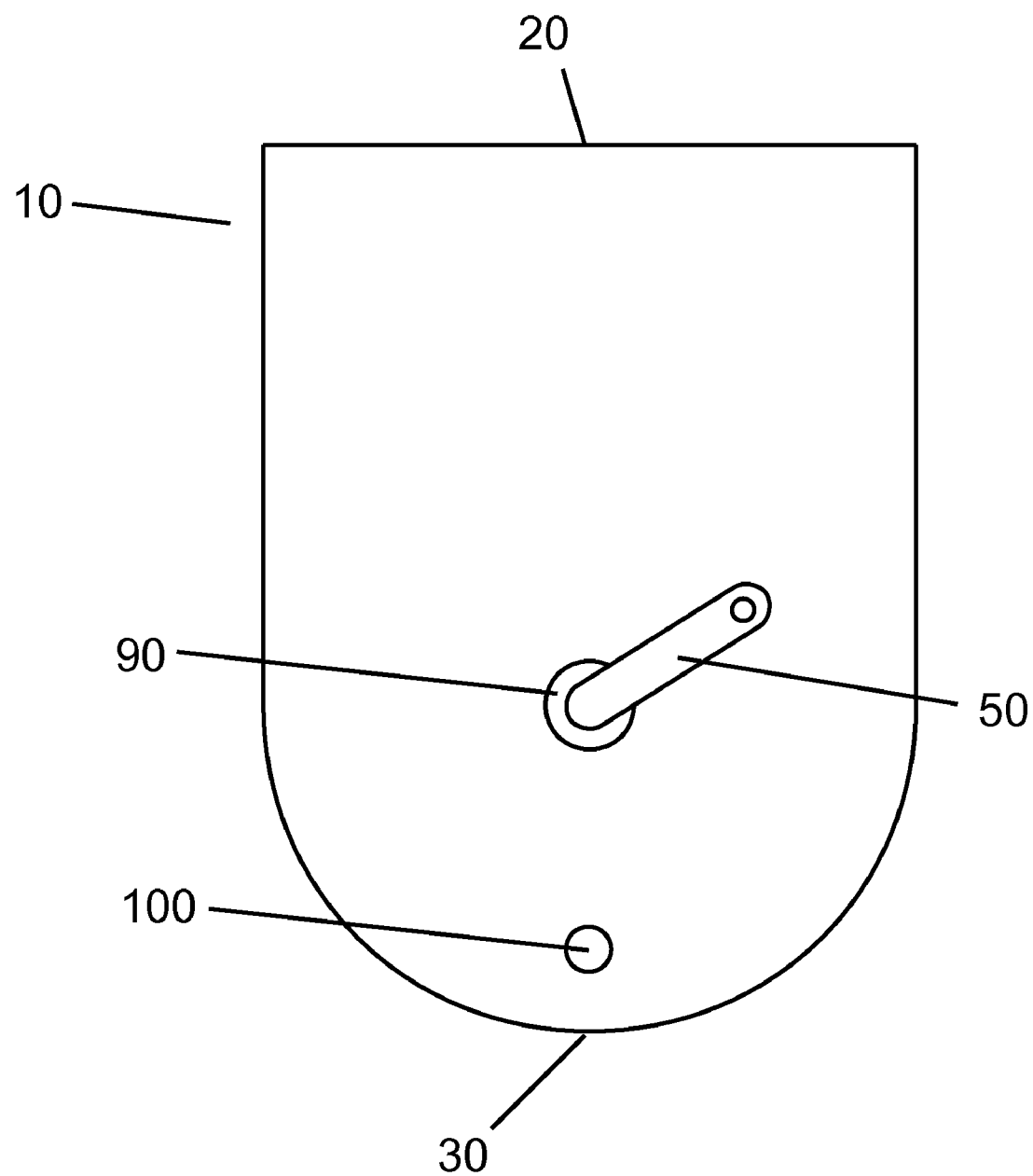
FIG. 7 shows a front view of a cheese crumbling device that is operated by turning the moving handle in a circular motion, in accordance with a sixth embodiment.
Figure 8:
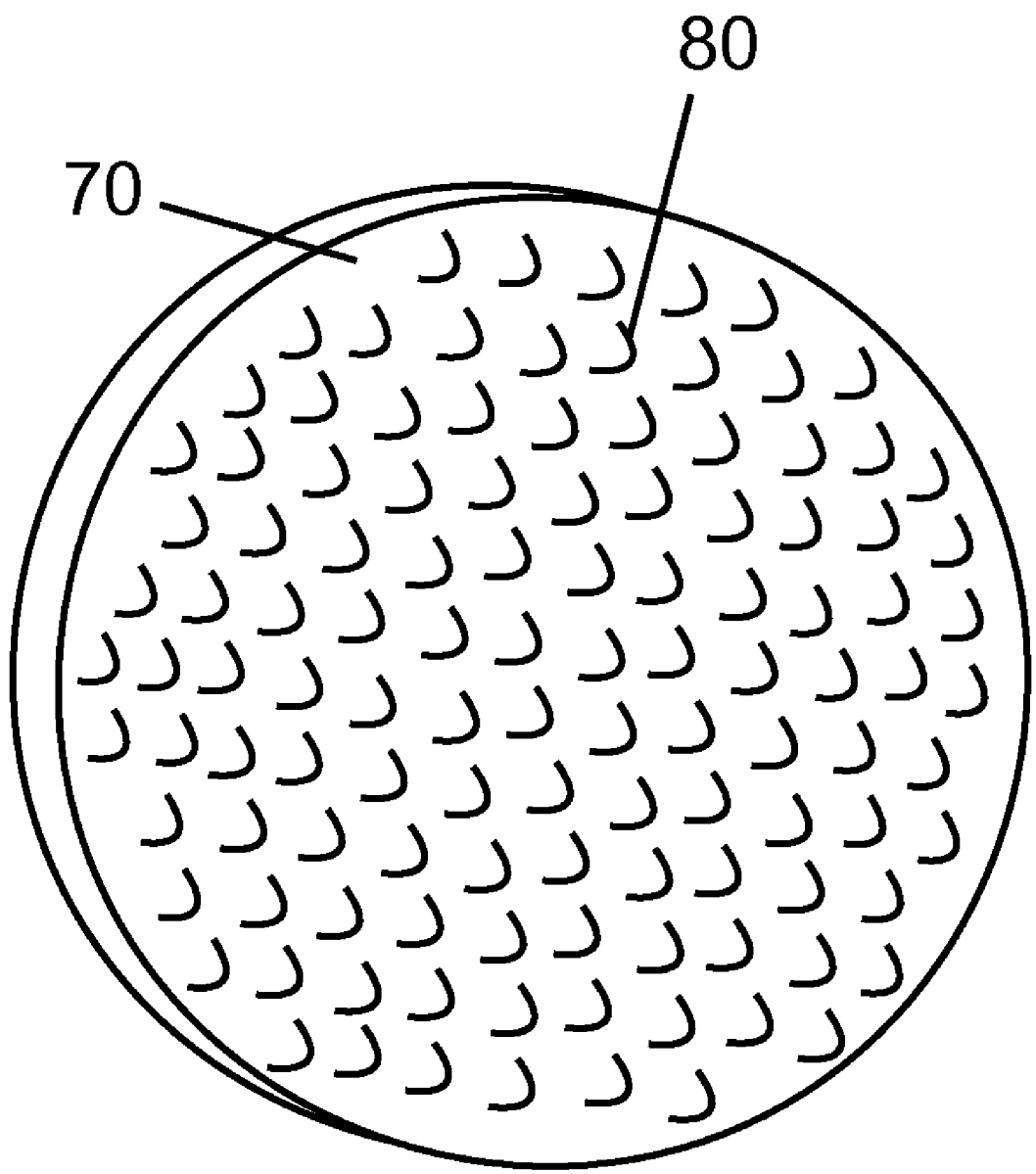
FIG. 8 shows a perspective view of one of the plates having a circular shape, in accordance with the embodiment shown in FIG. 7.

FIGS. 7, 8—Sixth Embodiment

An additional embodiment is shown in FIGS. 7 and 8. In this embodiment the lower portion of chute 10 has a semicircular shape and moving plate 70 and slot 90 have a circular shape. The device is operated by turning moving handle 50 in a circular motion.

Figure 9:
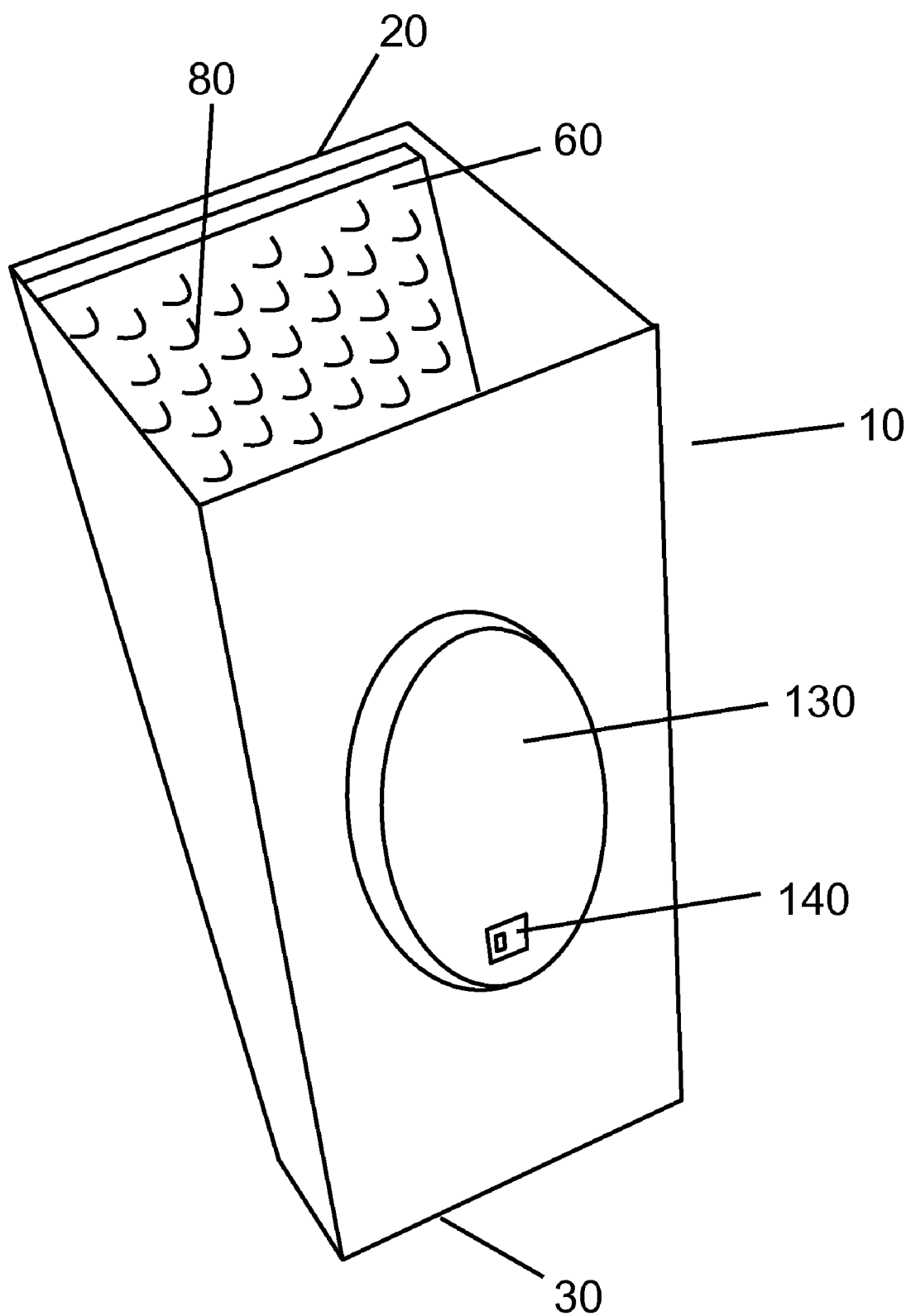
FIG. 9 shows a perspective view of a cheese crumbling device that is operated by using a motor, in accordance with a seventh embodiment.

FIG. 9—Seventh Embodiment

An additional embodiment is shown in FIG. 9. In this embodiment a motor 130 is attached to chute 10 on the side with moving handle 50. When turned on with switch 140, motor 130 moves moving handle 50 up and down, replacing the manual motion provided by the user in the other embodiments described here. Motor 130 can be detached from chute 10, allowing the device to be submerged in water or placed in a dishwasher for cleaning.

When this embodiment is used with stand 120, the user does not have to hold the device at all, freeing their hands for other activities such as feeding cheese into input 20 or holding dining plates or food containers under output 30.

Advantages

From the description above, a number of advantages of some embodiments of my cheese crumbling device become evident:

(a) The size and operating method of the device allow it to be used to efficiently crumble cheese in a home or restaurant kitchen during food preparation.

(b) The crumbled food particles can be dispensed directly onto dining plates or food containers in the kitchen or at the serving table.

(c) The user of the device can keep their hands clean while crumbling cheese.

(d) The protrusions on the opposing plates provide a similar crumbling action to a person crumbling cheese with their fingers, resulting in a crumble consistency similar to hand-crumbled cheese.

(e) The desired crumbled food particle size is selectable by the user.

(f) The device is safe and easy to operate, with no knife assemblies, wires, shredding cutters, or grating cutters that can injure the user.

(g) The device can be used by multiple people to dispense crumbled food particles directly onto their dining plates, without any of the users touching the cheese, preventing the spread of germs.

(h) The user can stop crumbling once they have a sufficient amount of cheese on their dining plate, then invert the device to remove the uncrumbled cheese, preserving it for later use.

(i) The device can be placed on a stand or used with a motor for easy one-handed operation, or can be placed on a stand and used with a motor for hands-free operation.

(j) The compact size and light weight of the device allow it to be easily stored and conveniently used in a kitchen or at a serving or eating table, as well as easily packed and shipped.

(k) The device is easy to clean, durable, and dishwasher-safe.

CONCLUSION, RAMIFICATIONS, AND SCOPE

As shown in the various embodiments of the cheese crumbling device described here, the device allows the user to quickly and efficiently crumble popular cheeses such as blue cheese, feta cheese, and Gorgonzola cheese while keeping their hands clean. The crumbles are produced with a motion and surfaces that simulate hand-crumbling. The surfaces used to crumble the cheese are safe for the user, as they do not perform any type of cutting action. The compact size and simple construction of the device allow it to be easily manufactured, shipped, cleaned, maintained, and stored. The compact size also allows the device to be easily used at a serving table or in a typical home or restaurant kitchen.

The size of the crumbled cheese particles produced by the device is easily selectable by the user by turning a conveniently located gap control screw. The device can be place on an optional stand for easy one-handed operation, and a motor can be used in place of manual operation to actuate the crumbling action. When the stand and motor are used in combination, the device does not need to be held at all by the user while it is operating.

Although the description above contains many specificities, these should not be construed as limiting the scope of the embodiments but as merely providing illustrations of some of several embodiments. For example, the specific motions of the moving plate that are described can be used in various combinations to achieve a similar crumbling action; the rounded protrusions, recesses, ridges, and grooves shown in the figures can be replaced with a variety of alternately shaped protrusions, recesses, ridges, and grooves, as long as the smooth, rounded surfaces of the features, required to provide a hand crumbling action, are maintained; the gap control screw can be replaced with other mechanisms for controlling the spacing between the plates such as an adjustable lever arm, positionable bearings, or swappable spacers which vary in size; the handles can be attached in different orientations; different patterns of protrusions, recesses, ridges, and grooves can be used on the opposing plates; the device can be used to crumble other types of foods or materials with similar consistency as the cheeses mentioned above.

Thus the scope of the embodiments should be determined by the appended claims and their legal equivalents, rather than by the examples given.

I claim:

1. A device for crumbling food into food particles with an irregular shape, comprising:
   (a) a chute with openings on at least one of the two ends of said chute,
   (b) two plates mounted on the inside of said chute, such that said plates oppose each other with sufficient space between them to accommodate said food, where the gap between the top of said plates is larger than the gap between the bottom of said plates, with at least one of said plates sized such that it can be moved within said chute in a motion selected from the group consisting of up-and-down, side-to-side, diagonal, circular, in-and-out, and mixtures thereof relative to said opposing plate,
   (c) a plurality of features selected from the group consisting of protrusions, recesses, ridges, grooves, and mixtures thereof, all having smooth, rounded, finger-like shapes, located on a surface of at least one of said plates, where said surface faces said opposing plate, and
   (d) at least one handle that is connected to one of said plates such that when said handle is moved, said plate is moved relative to said opposing plate,
   whereby said food will be inserted into said chute, said food is then crumbled between said opposing plates when at least one of said plates is moved relative to said opposing plate using said handle, said food is converted into progressively smaller said food particles as it falls down between said plates, and then said food particles are removed from said chute after said food has been sufficiently crumbled.

2. The device of claim 1 wherein said chute has an opening at the top of said chute and an opening at the bottom of said chute, whereby said food particles fall out of said opening at the bottom of said chute after said food has been crumbled.

3. The device of claim 1 wherein at least one of said plates has a shape selected from the group consisting of circular and rectangular.

4. The device of claim 1, further including at least one gap control and means for coupling said gap control to at least one of said plates, whereby the distance between said plates is varied when said gap control is adjusted.

5. The device of claim 4 wherein said gap control is an adjustment screw located on a part of said device selected from the group consisting of one of said handles and said chute and said adjustment screw is connected to one of said plates.

6. The device of claim 1 wherein said device is of an appropriate size and weight to accommodate use by a human being when said human being is holding said device above a food container.

7. The device of claim 1, further including a stand and at least one connector, where said chute is securely attached to said stand using said connector.

8. The device of claim 1, further including a motor and means for controllably coupling energy from said motor to at least one of said plates, whereby said plate is moved relative to said opposing plate.

9. A device for crumbling food into irregularly shaped particles, comprising:
   (a) two plates that oppose each other with sufficient space between them to accommodate said food, where the gap between the top of said plates is larger than the gap between the bottom of said plates,
   (b) a plurality of features selected from the group consisting of protrusions, recesses, ridges, grooves, and mixtures thereof, all having smooth, rounded, finger-like shapes, located on a surface of at least one of said plates, where said surface faces said opposing plate,
   (c) a housing that holds said plates in an opposing position while allowing at least one of said plates to be moved in a motion selected from the group consisting of up-and-down, side-to-side, diagonal, circular, in-and-out, and mixtures thereof relative to said opposing plate, and
   (d) at least one handle that is connected to one of said plates such that when said handle is moved, said plate is moved relative to said opposing plate,
   whereby said food will be inserted between said plates at the top of said plates, said food is then crumbled between said plates when at least one of said plates is moved relative to said opposing plate using said handle, said food is converted into progressively smaller said food particles as it falls down between said plates, and then when said food particles are sufficiently small said food particles drop through said gap between the bottoms of said plates.

10. The device of claim 9 wherein said housing is a chute with openings on its ends.

11. The device of claim 9 wherein said housing is a structure having three sides, such that when one of said plates is attached to said housing, a chute is formed, with said chute having openings on its ends.

12. The device of claim 9 wherein said housing is a structure having two opposing sides, such that when both of said plates are attached to said housing, a chute is formed, with said chute having openings on its ends.

13. The device of claim 9 wherein at least one of said plates has a shape selected from the group consisting of circular and rectangular.

14. The device of claim 9, further including at least one gap control and means for coupling said gap control to at least one of said plates, whereby the distance between said plates is varied when said gap control is adjusted.

15. The device of claim 14 wherein said gap control is an adjustment screw located on an area of the device selected from the group consisting of one of said handles and said housing and said adjustment screw is connected to one of said plates.

16. The device of claim 9 wherein said device is of an appropriate size and weight to accommodate use by a human being when said human being is holding said device above a food container.

17. The device of claim 9, further including a stand and at least one connector, where said housing is securely attached to said stand using said connector.

18. The device of claim 9, further including a motor and means for controllably coupling energy from said motor to at least one of said plates, whereby said plate is moved relative to said opposing plate.

19. A method for crumbling food into food particles having an irregular shape, comprising:
  (a) depositing said food into the top of a chute which includes two plates that oppose each other with sufficient space between them to accommodate said food, where the gap between the tops of said plates is larger than the gap between the bottoms of said plates, and at least one of said plates contains a plurality of features selected from the group consisting of protrusions, recesses, ridges, grooves, and mixtures thereof, all having smooth, rounded, finger-like shapes, on the surface of said plate which faces said opposing plate, and
  (b) moving at least one of said plates relative to the other plate such that said food is crumbled by said features as it drops between the opposing surfaces of said plates, with said food particles becoming progressively smaller as they drop progressively lower between said plates until said food particles fall through said gap between the bottoms of said plates, whereby said food is crumbled into said food particles having an irregular shape.

20. The method of claim 19, further including using a gap control to adjust said gap between the bottoms of said plates, prior to the crumbling of said food, whereby the size of said food particles that fall between said gap between the bottoms of said plates is varied.

* * * * *